United States Patent [19]

Tsou

[11] Patent Number: 5,537,425
[45] Date of Patent: Jul. 16, 1996

[54] PARITY-BASED ERROR DETECTION IN A MEMORY CONTROLLER

[75] Inventor: Henry H. Tsou, San Jose, Calif.

[73] Assignee: International Business Machines Corporation, Armonk, N.Y.

[21] Appl. No.: 953,417

[22] Filed: Sep. 29, 1992

[51] Int. Cl.[6] .................................................. G06F 11/10
[52] U.S. Cl. .......................... 371/51.1; 371/49.2; 371/48
[58] Field of Search ................................. 371/51.1, 49.1, 371/50.1, 48, 67.1, 71, 24, 7, 40.1, 40.4, 37.4, 10.1, 21.1, 2.2, 49.3, 49.2; 395/575, 425, 725; 360/83, 31

[56] References Cited

U.S. PATENT DOCUMENTS

| | | | |
|---|---|---|---|
| 3,585,378 | 5/1971 | Bouricius | 235/153 |
| 3,599,146 | 8/1971 | Weisbecker | 235/153 |
| 3,789,204 | 1/1974 | Barlow | 235/135 AM |
| 3,887,901 | 6/1975 | Moore, III | 340/146.1 AG |
| 4,345,328 | 8/1982 | White | 371/38 |
| 4,417,339 | 11/1983 | Cantarella | 371/37 |
| 4,652,321 | 3/1987 | Woffinden et al. | 371/38 |
| 4,757,440 | 7/1988 | Scheuneman | 364/200 |
| 4,774,712 | 9/1988 | Lewis | 371/51 |
| 4,785,452 | 11/1988 | Petz et al. | 371/38 |
| 4,799,222 | 1/1989 | Barlow et al. | 371/51 |
| 5,072,450 | 12/1991 | Helm et al. | 371/21.6 |
| 5,280,601 | 1/1994 | Desai et al. | 395/425 |
| 5,345,582 | 9/1994 | Tsuchiya | 395/573 |

OTHER PUBLICATIONS

"Preventing Address Misrecognition" by G. N. Martin & C. N. Wallis; IBM Bulletin; vol. 27, No. 8; Jan. 1985.
"Error Correction Codes With Address Checking" by T. L. Mann; IBM Bulletin; vol. 32, No. 1; Jun. 1989.

Primary Examiner—Robert W. Beausoliel, Jr.
Assistant Examiner—Phung My Chung
Attorney, Agent, or Firm—Baker, Maxham, Jester & Meador

[57] ABSTRACT

A memory controller parity system that detects both even and odd bit errors in memory addresses and global errors in memory data. The parity system detects errors in any memory system employing an address bus or data allocation map. It is effective for applications requiring random memory accesses as well as in blocked-data accesses such as in controller buffer memories for servicing disk file systems and tape storage systems. The controller stores data in memory together with a single appended global parity bit representing (n-1) bits from an n-bit address, thereby detecting both even and odd fixed errors over time. A p-bit identification register can be added to the controller to facilitate detection over time of global data errors arising from data allocation map errors during the data storage period. The single-bit parity scheme is compatible with existing single-bit parity memory systems.

11 Claims, 8 Drawing Sheets

IDENTIFICATION STAMP

LOCATION STAMP

FIG. 3 ADDRESS BIT SELECTION

| Address Bits A15 to A4 | A3 | A2 | A1 | A0 | Global Parity Function | Excluded Address Bit |
|---|---|---|---|---|---|---|
| Don't care state | 0 | 0 | 0 | 0 | DP⊕AP⊕A0 | A0 |
| | 0 | 0 | 0 | 1 | DP⊕AP⊕A1 | A1 |
| | 0 | 0 | 1 | 0 | DP⊕AP⊕A2 | A2 |
| | 0 | 0 | 1 | 1 | DP⊕AP⊕A3 | A3 |
| | 0 | 1 | 0 | 0 | DP⊕AP⊕A4 | A4 |
| | 0 | 1 | 0 | 1 | DP⊕AP⊕A5 | A5 |
| | 0 | 1 | 1 | 0 | DP⊕AP⊕A6 | A6 |
| | 0 | 1 | 1 | 1 | DP⊕AP⊕A7 | A7 |
| | 1 | 0 | 0 | 0 | DP⊕AP⊕A8 | A8 |
| | 1 | 0 | 0 | 1 | DP⊕AP⊕A9 | A9 |
| | 1 | 0 | 1 | 0 | DP⊕AP⊕A10 | A10 |
| | 1 | 0 | 1 | 1 | DP⊕AP⊕A11 | A11 |
| | 1 | 1 | 0 | 0 | DP⊕AP⊕A12 | A12 |
| | 1 | 1 | 0 | 1 | DP⊕AP⊕A13 | A13 |
| | 1 | 1 | 1 | 0 | DP⊕AP⊕A14 | A14 |
| | 1 | 1 | 1 | 1 | DP⊕AP⊕A15 | A15 |

BUS 48

IDENTIFICATION STAMP

FIG. 5  IDENTIFICATION BIT SELECTION

| Address Bits | | | | | Global Parity Function |
|---|---|---|---|---|---|
| A15 to A4 | A3 | A2 | A1 | A0 | |
| Don't care state | 0 | 0 | 0 | 0 | DP⊕AP⊕A0⊕I0 |
| | 0 | 0 | 0 | 1 | DP⊕AP⊕A1⊕I1 |
| | 0 | 0 | 1 | 0 | DP⊕AP⊕A2⊕I2 |
| | 0 | 0 | 1 | 1 | DP⊕AP⊕A3⊕I3 |
| | 0 | 1 | 0 | 0 | DP⊕AP⊕A4⊕I4 |
| | 0 | 1 | 0 | 1 | DP⊕AP⊕A5⊕I5 |
| | 0 | 1 | 1 | 0 | DP⊕AP⊕A6⊕I6 |
| | 0 | 1 | 1 | 1 | DP⊕AP⊕A7⊕I7 |
| | 1 | 0 | 0 | 0 | DP⊕AP⊕A8⊕I0 |
| | 1 | 0 | 0 | 1 | DP⊕AP⊕A9⊕I1 |
| | 1 | 0 | 1 | 0 | DP⊕AP⊕A10⊕I2 |
| | 1 | 0 | 1 | 1 | DP⊕AP⊕A11⊕I3 |
| | 1 | 1 | 0 | 0 | DP⊕AP⊕A12⊕I4 |
| | 1 | 1 | 0 | 1 | DP⊕AP⊕A13⊕I5 |
| | 1 | 1 | 1 | 0 | DP⊕AP⊕A14⊕I6 |
| | 1 | 1 | 1 | 1 | DP⊕AP⊕A15⊕I7 |

BUS 60

BUS 48

PARITY-BASED ERROR DETECTION IN A MEMORY CONTROLLER

BACKGROUND OF THE INVENTION

1. Field of the Invention

This invention relates to error detection methods for memory arrays and, more specifically, to a system for parity-based detection of even numbers and odd numbers of address bit errors and memory data errors.

2. Discussion of the Related Art

As data is transferred through a data processing machine, hardware failures, including device failures and connection failures, can cause data errors. For instance, where a single wire connection fails in a 16-bit data bus, the data passed over the bus will have a single bit error from the failed connection about half of the time. Also, in a storage device, failure of one or more bits can introduce data errors when data is first written into the storage device and then read from the storage device. Again, lock-up of a single bit introduces data errors about half of the time, reducing error detection probability accordingly.

A common method for detecting data errors involves computation of the parity of a data word. This single parity bit is then transmitted and stored together with the associated word. When the word is received, the parity is recomputed and compared with the accompanying parity bit. Parity disagreement alerts the data processing system to the presence of an odd number of bit errors. Unfortunately, simple parity-check error detection cannot detect even numbers of bit errors.

Practitioners in the art have proposed various means for improving error detection and error correction over the simple parity-check model. The effective ones of these methods tend to be expensive and complex.

In U.S. Pat. No. 4,799,222, George J. Barlow et al disclose a method for transforming address words and transferring addresses containing "integrity bits". Barlow et al teach a method and apparatus for verifying that address incrementing and transfer is performed without error by logically combining the incremented address with the transformed bits and integrity bits of the unincremented address. Their technique cannot be implemented using a single parity bit extension to the address word.

In U.S. Pat. No. 4,785,452, Bruce R. Petz et al disclose an error detection scheme using variable field parity checking that relies on availability of reserved bits within control words. These variable numbers of extra error correction code bits are used to increase error detection capability in a control store for words having such extra bits available. The technique relies on availability of extra unused bits appended to the data word.

Other practitioners combine error detection with error correction and have long sought simple, inexpensive means for performing both. For instance, U.S. Pat. No. 4,417,339 issued to Robert G. Cantarella discloses a fault-tolerant correction circuit that relies on a modified Hamming code. Cantarella's method corrects single bit errors and detects double bit errors and tolerates single parity-check subcircuit failures. Cantarella requires a number of "syndrome" bits to ensure fault-free parity subcircuit function.

U.S. Pat. No. 4,651,321 issued to Gary A. Woffinden et al discloses a method for reducing storage space requirements for error detection and correction in memory. Woffinden et al create an error checking and correcting code that incorporates the parity bits normally stored with the data word together with additional ECC bits. Their method requires more ECC bits than are normally expected in the art.

U.S. Pat. No. 4,345,328 issued to Gary D. White discloses a method for single-bit error correction and double-bit error detection using through-checking parity bits. The parity bits are appended to each byte as check bits. Additional check bits are required to perform single-bit error correction. Thus, White's method requires a significant plurality of extra bits for each data word.

T. L. Mann ("Error Correction Codes with Address Checking", IBM Technical Disclosure Bulletin, Vol. 32, No. 1, pp. 375–377, June 1989) suggests using residual ECC bits to protect address words from undetected errors, thus providing some assurance that the retrieved data word comes from the desired storage device location. Mann teaches the incorporation of ECC in both the data word and the address word but his Hamming code error correction technique requires a substantial number of additional bits.

G. N. Martin et al ("Preventing Address Misrecognition", IBM Technical Disclosure Bulletin, Vol. 27, No. 8, p. 4965, January 1985) suggest a simple technique for adding address redundancy to protect against address errors in storage devices using removable storage media. Martin et al suggest verifying an address identifier before either a read or write operation. They do not provide implementation details for their suggestion nor do they suggest how to overcome the many associated problems.

Thus, despite many efforts by practitioners in the art, until now there has been no simple method known for error detection in both address and data words in a storage device memory controller. A suitable method must consider the connections between a memory controller module and memory modules. These include the data bus, the address bus, the memory parity line, the write enable line and the output enable line. A memory parity bit is normally generated during the write operation and checked following the read operation within the memory controller. Detection of address bus errors and data bus errors requires a memory parity bit to be generated by a device having inputs that are identical to the address bus and data bus off-chip drivers in the memory controller module. Such a detection scheme works well only for odd numbers of address line errors. Even numbers of address bus bit errors are not detected in the present art.

The problem involving failure to detect address bus bit errors is exacerbated for the newer Dynamic Random Access Memory (DRAM) technology because the DRAM address bus carries the higher order address bits (row address) and the lower order address bits (column address) at two separate times. A single address bus fault may now appear as a double-bit error to the address bus.

Another potential problem is related to the data allocation map used to track data storage locations within a memory system. A mismatch between a record identification number and the memory address stored in the allocation map can retrieve the wrong data word without notice. For example, suppose that record identification number A is assigned at memory address B in the data allocation map when the write (store) operation occurred. Subsequent misassignment of record identification number A to memory address X in the data allocation map retrieves the wrong data in a read operation. Even data in a memory system that is protected by some ECC/CRC technique can not detect the data allocation map errors. Such an error is denominated herein as a global data error.

These unresolved problems and deficiencies are clearly felt in the art and are solved by this invention in the manner described below.

SUMMARY OF THE INVENTION

This invention introduces two new concepts for error detection that are denominated (a) the "Location Stamp" for detecting memory address faults and (b) the "Identification Stamp" for detecting global data errors. The Location Stamp technique employs simple parity checking to detect any combination of errors on an address bus in a memory controller. Similarly, the Identification Stamp technique uses a single identification register and simple parity-check to detect mismatch in the data allocation map between write and read operations. The Location Stamp detects both even and odd bit errors in memory addresses and the Identification Stamp detects global errors in data. These two methods are particularly effective in applications requiring long strings of sequential memory accesses, such as disk file controller memories and tape storage system controller memories. The methods are nearly as effective with random memory accesses.

To detect memory address errors, parity representing n-1 bits from an n-bit address word is generated and appended as the controller stores data in memory. A different bit is blanked during address parity generation for each consecutive address in a sequence of n addresses, establishing a blanking pattern that repeats with a period of n. When the data is retrieved from memory, the parity bit for the proper n-1 address bits is regenerated for each address and checked against the parity bit that was stored with the data. For a particular address, the n-1 bit parity check detects single bit errors, triple bit errors, and so forth, across the n-1 bits for which parity was actually generated. The n-1 parity bit check also detects double bit errors, quadruple bit errors, and so forth, across all n bits where one of the bit errors occurs in the blanked-out bit. Thus, any stuck fault that causes an odd bit error is always detected within two consecutive memory addresses. Any stuck fault that causes an even bit error is always detected within n consecutive memory addresses.

The method of this invention for detection of global errors requires a p-bit identification register. As the controller stores data in memory, a selected bit from the identification register is included in the parity generation tree. A different bit from the identification register is included for each consecutive address in a sequence of p addresses, establishing a pattern that repeats with a period of p. When a data word is retrieved from memory, the same identification bit is once again selected to the parity generation tree. Thus, any data corruption is evident as a mismatch in global parity within a string of several data word transfers from consecutive memory addresses.

Successful error detection does not rely on consecutive memory access. The method of this invention works very well with random memory accesses provided that the read (retrieval) operation encompasses a plurality of memory addresses that blanks every bit in the address bus and selects every bit in the identification register. This can be appreciated by referring to the detailed specification below.

It is a purpose of this invention to provide fail-safe address and data word error detection through the use of a single appended global parity bit in each data word. It is an advantage of this invention that only a single parity bit is used, thereby making it compatible with existing memory systems that consist of a plurality of single parity-bit data words.

The foregoing, together with other objects, features and advantages of this invention will become more apparent when referring to the following specification, claims and the accompanying drawings.

BRIEF DESCRIPTION OF THE DRAWING

For a more complete understanding of this invention, reference is now made to the following detailed description of the embodiments as illustrated in the accompanying drawings, wherein:

FIG. 3 provides an illustrative truth table for the Location Stamp feature of this invention;

FIG. 5 provides an illustrative truth table for the Identification Stamp feature of this invention;

DETAILED DESCRIPTION OF THE PREFERRED EMBODIMENTS

Figure 1:
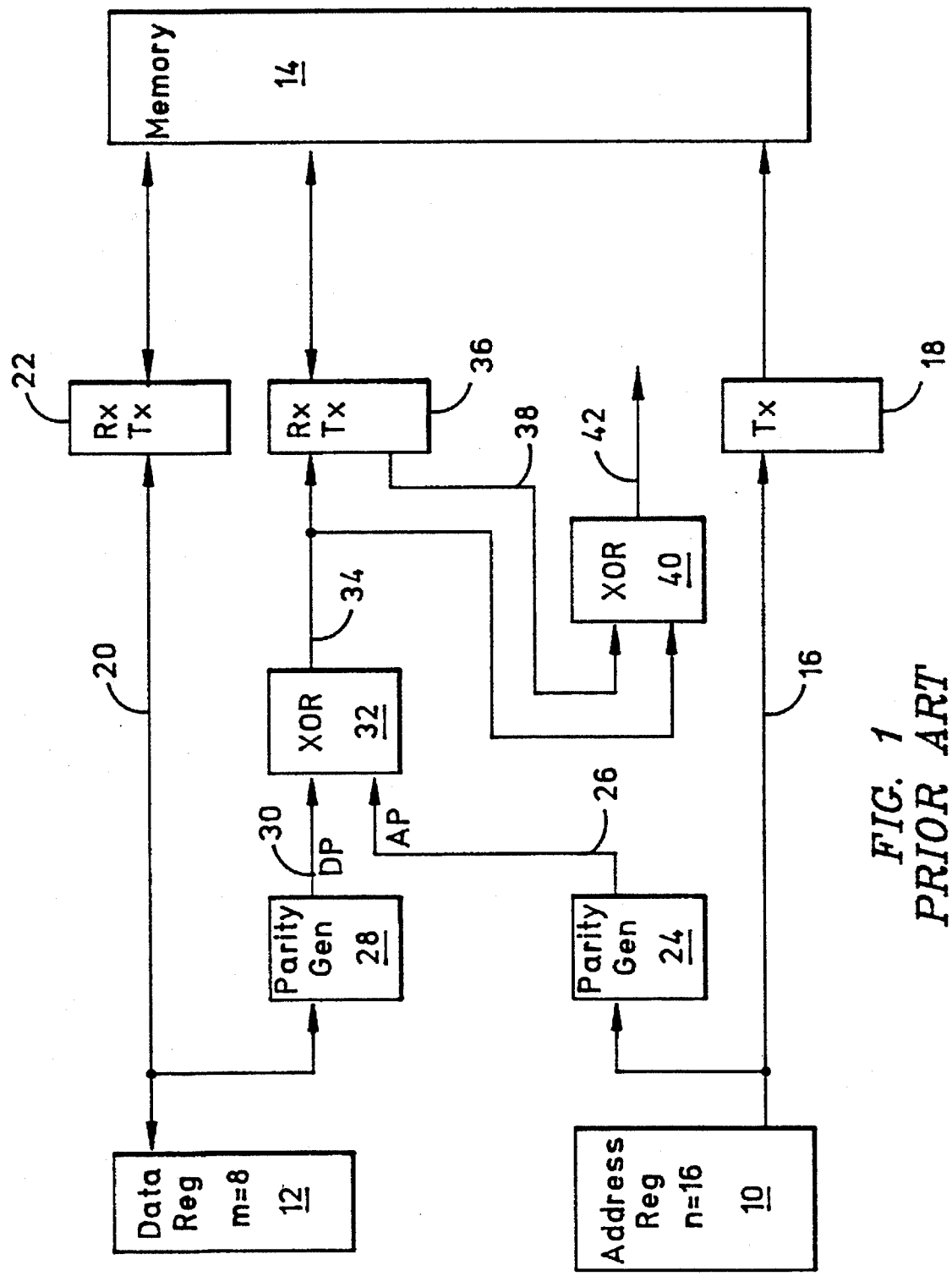
FIG. 1 shows a typical embodiment of an address bus fault detection circuit from the prior art.

FIG. 1 provides a block diagram illustrating a typical memory parity generation scheme from the prior art. A 16-bit address register 10 and an 8-bit data register 12 are coupled to a storage device 14. Address register 10 is coupled to storage device 14 through a 16-bit address bus 16 and the address bus drivers 18. Data register 12 is coupled to storage device 14 through an 8-bit data bus 20 and bi-directional data drivers 22.

The address parity generator 24 accepts the sixteen bits from address register 10 and creates a single address parity bit at line 26. Similarly, data parity generator 28 accepts the eight bits from data register 12 and creates a single data parity bit at line 30. As is well-known in the art, the "parity" of a plurality of bits is a single bit representing the least significant bit (LSB) of the binary sum of the plurality of bits. This rule yields a parity bit value of "1" for an odd number of binary "1's" and a parity value of "0" for an even number of binary "1's", as is well-known.

Address parity bit 26 and data parity bit 30 are combined by an exclusive-OR gate 32 to create the global parity bit 34. Global parity bit 34 is then coupled to storage device 14 through a bi-directional parity bit driver 36.

In operation, global parity bit 34 is appended to the data word on bus 20 and stored in storage device 14 in a location specified by the address presented on bus 16. This storage operation occurs in response to a storage command from an external source (not shown).

Responsive to a retrieval command from an external source (not shown), a data word is retrieved from storage device 14 on bus 20 and stored in data register 12. The location in storage device 14 is specified by the address presented on bus 16. At the same time, the appended global parity bit is retrieved on line 38 through bi-directional parity driver 36. Thus, during the retrieval cycle, the retrieved global parity bit 38 is compared to a new global parity bit 34 regenerated from the retrieved data word on bus 20 and the address on bus 16. This comparison is made by a second exclusive-OR gate 40, which generates a global parity check bit 42. A "1" value for global parity check bit 42 indicates a parity error condition.

The memory controller circuit shown in FIG. 1 is unable to detect error conditions having even numbers of bit errors in either data bus 20 or address bus 16 or in both. The parity check apparatus in FIG. 1 can detect odd numbers of bit errors in data bus 20 and address bus 16. However, with errors in two high-order address bus bits that do not change state during a series of retrieval operations, a data word is retrieved from the wrong location in storage device 14 without notice of error. Similar stuck faults on data bus 20 present fewer problems because most data are random in nature. Undetected error conditions occurring continuously over several data words is a relatively low probability event. Thus, this method is suitable for stuck faults on the address bus, which pose serious problems in storage systems.

Figure 2:
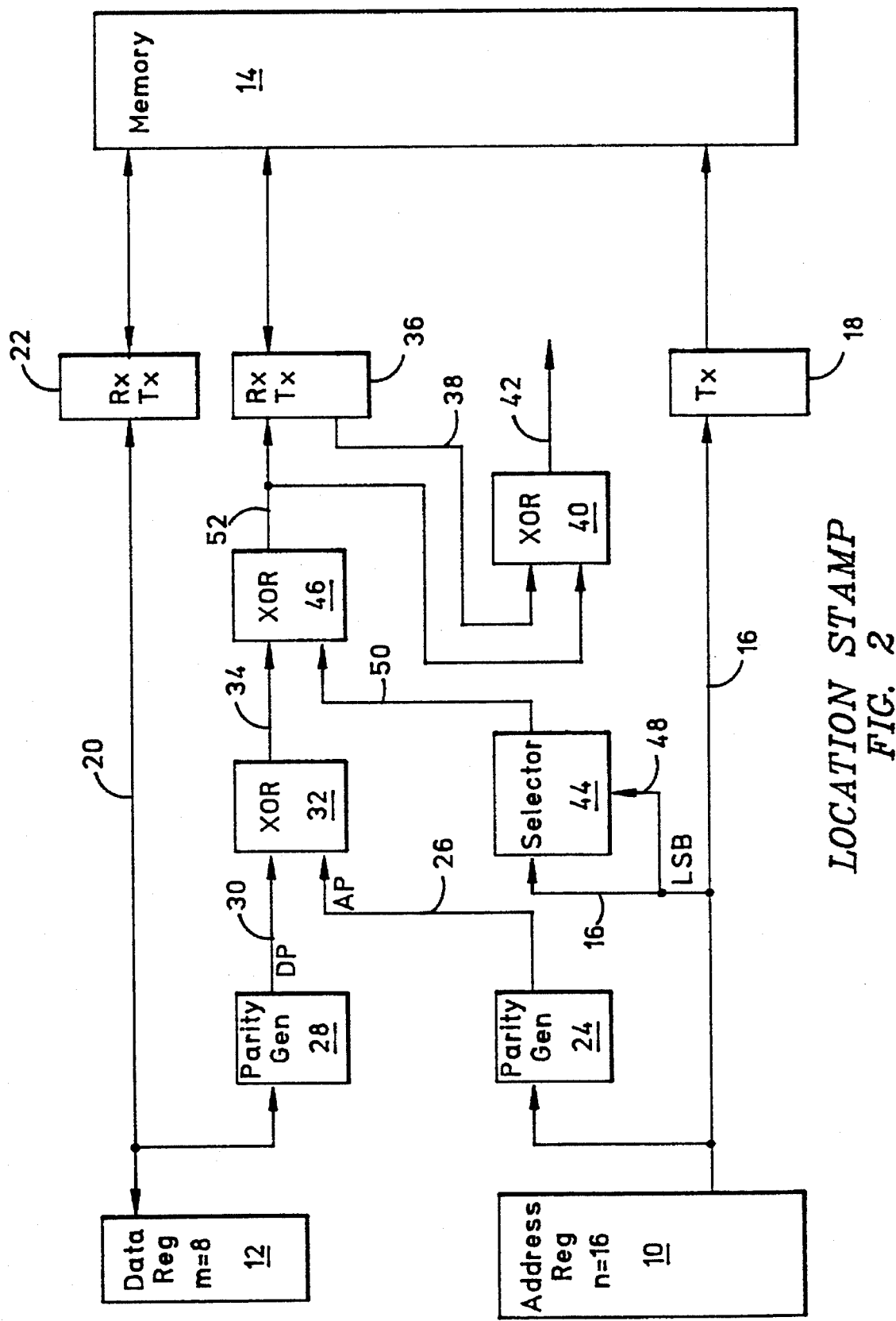
FIG. 2 shows an illustrative embodiment of the address bus fault detection apparatus of this invention.
Figure 8:
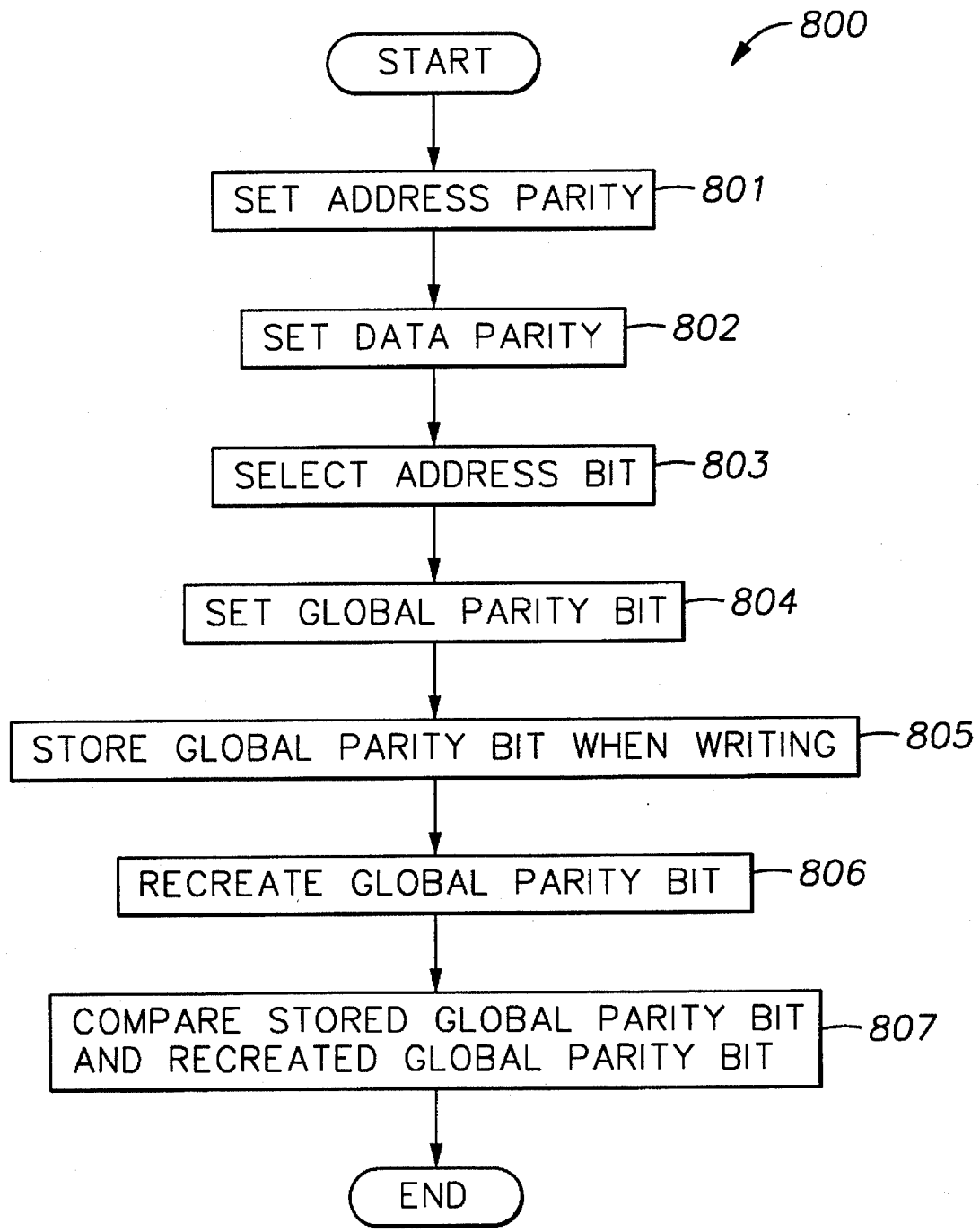
FIG. 8 illustrates a sequence of exemplary method steps corresponding in FIG. 1.

FIG. 2 provides a block diagram of the preferred embodiment of the Location Stamp apparatus of this invention. Reference is concurrently made to FIG. 8, which depicts a sequence of operation 800 for the Location Stamp apparatus. The apparatus in FIG. 2 is generally similar to the apparatus in FIG. 1 except for the addition of the address bit selector 44 and the exclusive-OR gate 46. Address bus 16 is connected to address bit selector 44. The address parity generator 24 accepts the sixteen bits from address register 10 and creates a single address parity bit at line 26. (see task 801, FIG. 8) Similarly, data parity generator 28 accepts the eight bits from data register 12 and creates a single data parity bit at line 30. (see task 802. FIG. 8). A predetermined number of Least Significant Bits (LSBs) from address bus 16 are presented to address bits selector 44 on a LSB address bus 48. The binary values presented on LSB address bus 48 determine the single address bit 50 that is selected from the available bits on address bus 16. (see task 803, FIG. 8) Single address bit 50 is then presented to XOR gate 46 as shown in FIG. 2.

Inspection of FIG. 2 shows that global parity bit 34 in FIG. 1 is now combined with single address bit 50 at XOR gate 46. The output of XOR gate 46 is the new global parity bit 52, (see task 804, FIG. 8) which incorporates data parity bit 30, address parity bit 26 and single address bit 50. Global parity bit 52 is equivalent to data parity bit 30 and the parity of all bits in address register 10 with the exception of address bit 50. Thus, in FIG. 2, global parity bit 52 represents the eight bits in data register 12 and (n-1) bits in address register 10. It is readily appreciated that at least four LSBs on LSB address bus 48 are needed to fully span and select one of the sixteen bits in address register 10.

In operation, global parity bit 34 is appended to the data word on bus 20 and stored in storage device 14 in a location specified by the address presented on bus 16. (see task 805, FIG. 8) This storage operation occurs in response to a storage command from an external source (not shown).

Responsive to a retrieval command from an external source (not shown), a data word is retrieved from storage device 14 on bus 20 and stored in data register 12. The location in storage device 14 is specified by the address presented on bus 16. At the same time, the appended global parity bit is retrieved on line 38 through bi-directional parity driver 36. (see task 806. FIG. 8) Thus, during the retrieval cycle, the retrieved global parity bit 348 is compared to a new global parity bit 34 regenerated from the retrieved data word on bus 20 and the address on bus 16. (see task 807, FIG. 8) This comparison is made by the second exclusive-OR gate 40, which generates a global parity check bit 42.

FIG. 3 provides a simple address bit selection table illustrating the operation of the Location Stamp apparatus of FIG. 2. The global parity function DP+AP+A0 is identical to the parity obtained by combining DP with the first fifteen address bits, excluding A0. Thus, the first entry in FIG. 3 reveals the presence of odd bit errors on the address bus and the data bus, if address bit A0 has no error. If address bit A0 is in error, the first entry reveals even numbers of bit errors, including the error at address bit A0, over the two buses. Accordingly, if a data retrieval operation occurs over each of the sixteen address permutations illustrated in FIG. 3, all possible odd numbers of bit errors in the two buses and all even numbers of errors in the address bus are revealed as a global parity error at bus 42 in FIG. 2.

The Location Stamp apparatus of this invention does not attempt detection of even data bit errors on data bus 20 and does not consider data errors occurring in the memory controller logic (not labelled). The detectable errors include faults occurring at storage device 14, in the connection between storage device 14 (memory modules) and the memory controller (not labelled), in bi-directional drivers 22 and 36 and in address bus drivers 18.

Figure 4:
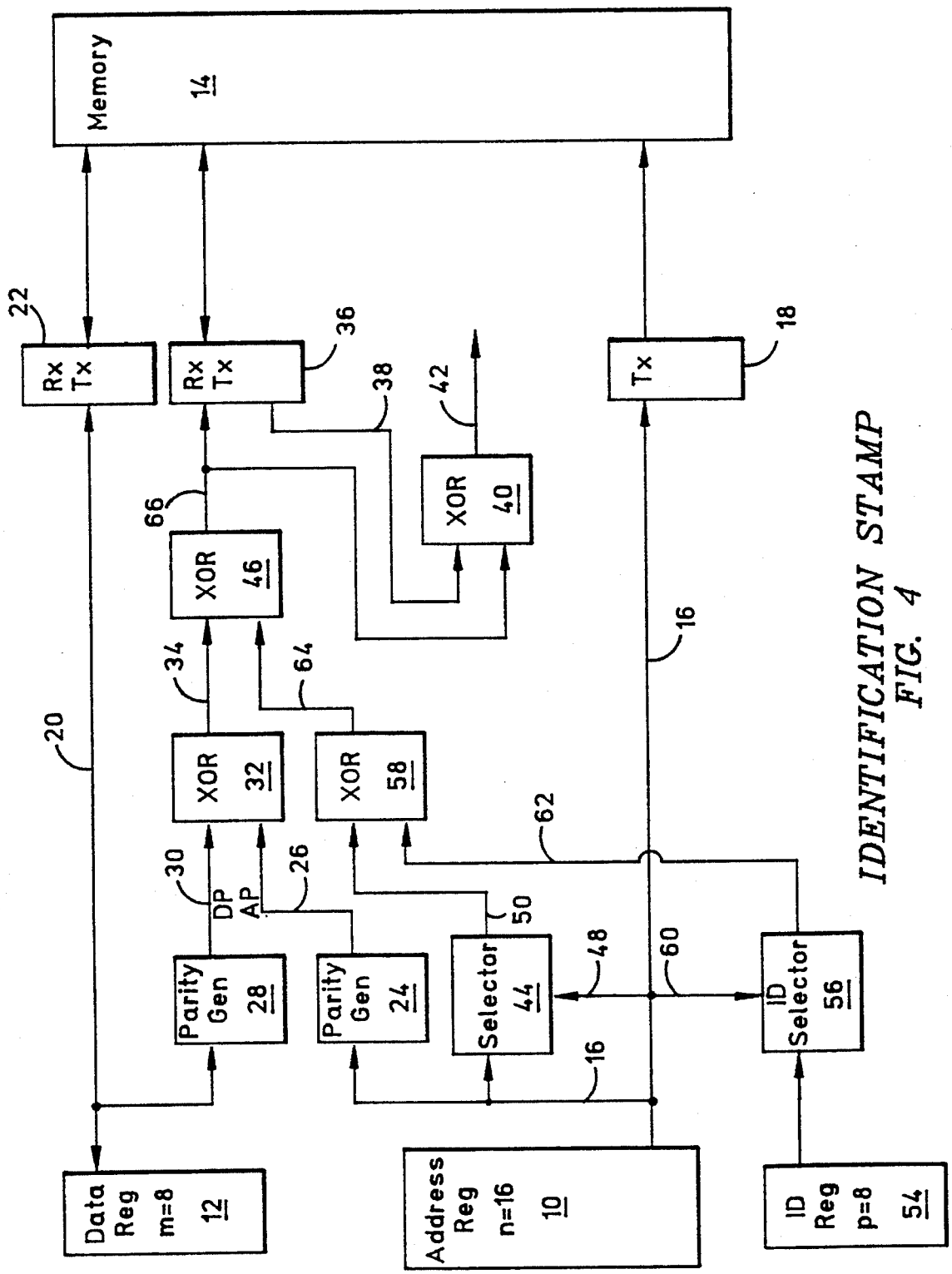
FIG. 4 shows an illustrative embodiment of the memory fault detection apparatus of this invention.
Figure 9:
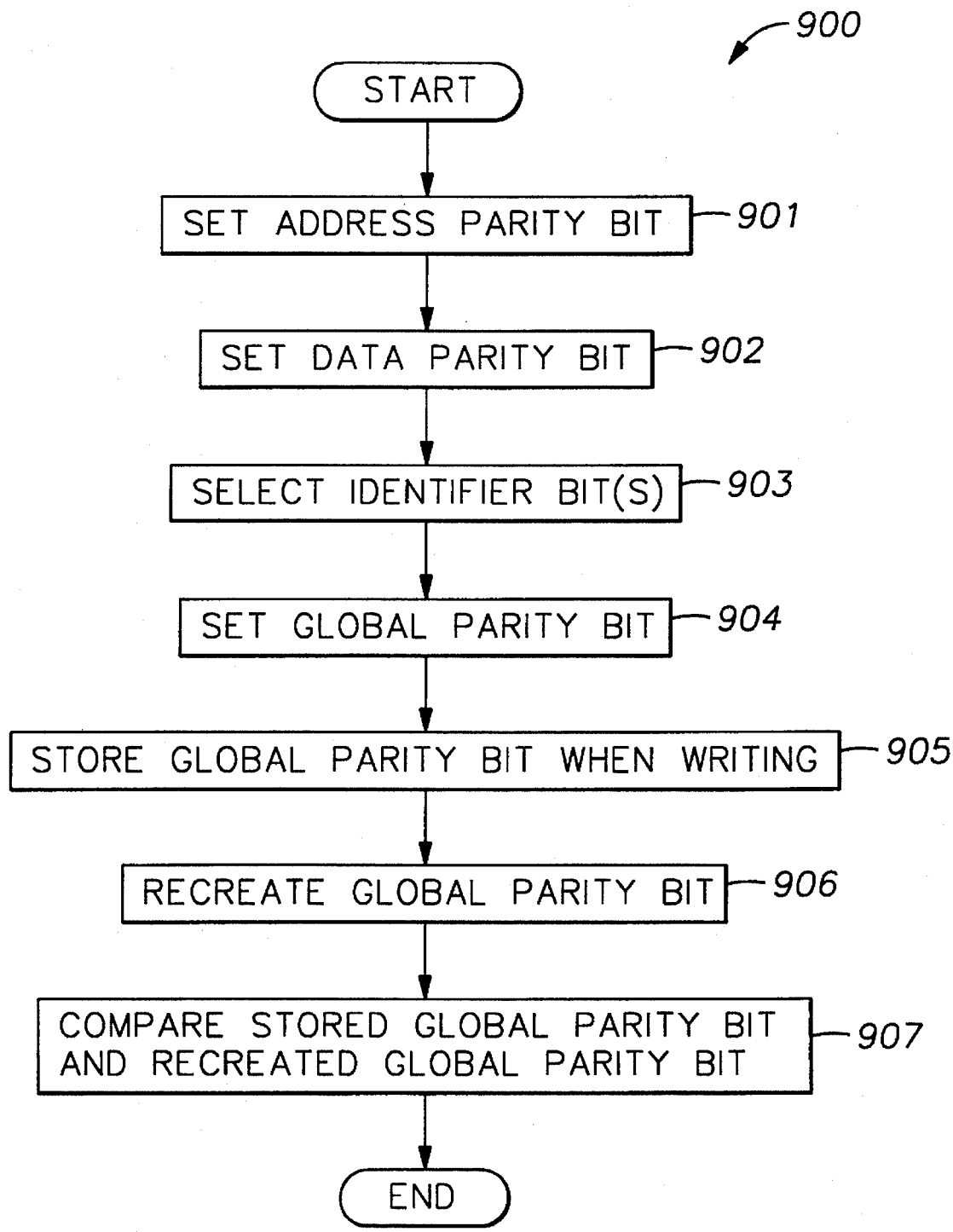
FIG. 9 illustrates a sequence of exemplary method steps corresponding to FIG. 4.

FIG. 4 shows a block diagram of the preferred embodiment of the Identification Stamp apparatus of this invention. Reference is concurrently made to FIG. 9, which depicts a sequence of operation 900 for the Identification Stamp apparatus. The Identification Stamp apparatus includes all of the elements from FIG. 2 together with an identifier (ID) register 54, an identifier bit selector 56 and an exclusive-OR gate 58. The address parity generator 24 accepts the sixteen bits from address register 10 and creates a single address parity bit at line 26. (see task 901, FIG. 9) Similarly, data parity generator 28 accepts the eight bits from data register 12 and creates a single data parity bit at line 30. (see task 902, FIG. 9) The least significant bits (LSBs) from address bus 16 are presented to identifier selector 56 on the LSB identifier bus 60. The LSB values on LSB identifier bus 60 determine the single identifier bit 62 that is selected from identifier register 54. (see task 903, FIG. 9) Single identifier bit 62 is presented to XOR gate 58 together with single address bit 50. The parity bit 64 for these two bits is then obtained at XOR gate 58 and presented to XOR gate 46.

A new global parity bit 66 is created at XOR gate 46 by combining parity bit 64 for single address bit 50 and single identifier bit 62 with parity bit 34 for the combined address and data registers as shown in FIG. 4. (see task 904, FIG. 9) The remaining elements of the Identification Stamp apparatus shown in FIG. 4 operate in accordance with the above discussion in connection with FIGS. 1 and 2.

In particular, global parity bit 34 is appended to the data word on bus 20 and stored in storage device 14 in a location specified by the address presented on bus 16. (see task 905, FIG. 9) This storage operation occurs in response to a storage command from an external source (not shown).

Responsive to a retrieval command from an external source (not shown), a data word is retrieved from storage device 14 on bus 20 and stored in data register 12. The location in storage device 14 is specified by the address presented on bus 16. At the same time, the appended global parity bit is retrieved on line 38 through bi-directional parity driver 36. (see task 906. FIG. 9) Thus, during the retrieval cycle, the retrieved global parity bit 348 is compared to a new global parity bit 34 regenerated from the retrieved data word on bus 20 and the address on bus 16. (see task 907, FIG. 9) This comparison is made by the second exclusive-OR gate 40, which generates a global parity check bit 42.

Thus, it is readily appreciated that the Identification Stamp apparatus of this invention ensures retrieval of the correct data word from storage device 14. FIG. 5 illustrates the identification bit selection bit procedure implemented in FIG. 4. The example in FIG. 5 assumes that identifier register 54 is p=8 bits in length, requiring at least three LSBs on LSB identifier bus 60 to span and select single identifier bit 62 at identifier selector 56. The selection and processing of single address bit 50 using four LSBs on LSB bus 48 operates as discussed above in connection with FIG. 3.

The additional identifier bit 62 shown in FIG. 5 as I0–I7 is included to blend identifier registration information with data parity (DP) and address parity (AP) to form global parity bit 66. The Identification Stamp apparatus continuously records the associated identifier words while the memory controller is storing data and continuously checks the content of identifier register 54 during retrieval of data. Thus, any accidental data corruption during storage in storage device 14 is detected as a "1" bit at bus 42 in FIG. 4.

Although the examples presented in FIGS. 1–5 presume an 8-bit data register, a 16-bit address register and an 8-bit identifier register, the method and apparatus of this invention has general application to an n-bit address register, an m-bit data register and a p-bit identifier register. The number of LSBs required on LSB address bus 48 is simply $\lceil \log_2 m \rceil$ (rounded-up integer of $\log_2 m$). Similarly, the number of LSBs required on LSB identifier bus 60 is merely $\lceil \log_2 p \rceil$.

Both parity-based error detection methods of this invention are particularly effective in applications using block data transfers, which require long strings of sequential memory accesses. Such applications include buffer memory controllers for Direct Access Storage Devices (DASDs) and Magnetic Tape Storage Systems (MTSSs).

Figure 6:
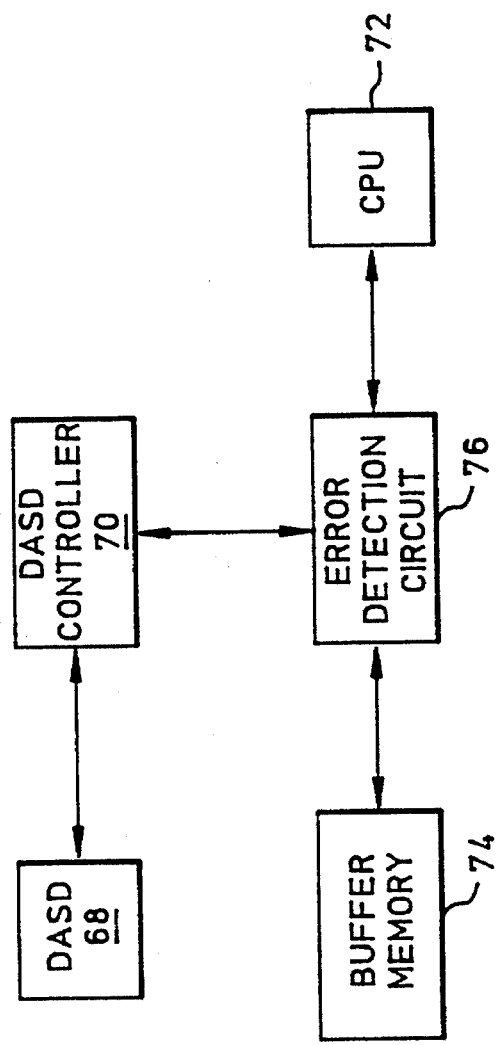
FIG. 6 illustrates the application of the error detection apparatus of this invention to a Direct Access Storage Device (DASD)

FIG. 6 shows how either technique of this invention can be applied to error detection in a DASD system. A DASD 68 is coupled to a DASD controller 70 in a manner well-known in the art. In operation, a Central Processing Unit (CPU) 72 sends and receives data to DASD 68 by way of controller 70 and a buffer memory 74. Buffer memory 74 permits CPU 72 to send a block of data without waiting for the slower controller 70 and DASD 68. Similarly, when CPU 72 is receiving data from DASD 68, buffer memory 74 serves to accumulate a data block of the predetermined size that can be moved through CPU 72 during a single block access cycle. Either error detection circuit 76 of this invention may be situated as shown in FIG. 6, coupled to buffer memory 74 and to both DASD controller 70 and CPU 72. Either the Location Stamp apparatus (FIG. 2) or the Identification Stamp apparatus (FIG. 4) is suitable for disposition within error circuit 76 (FIG. 6).

Figure 7:
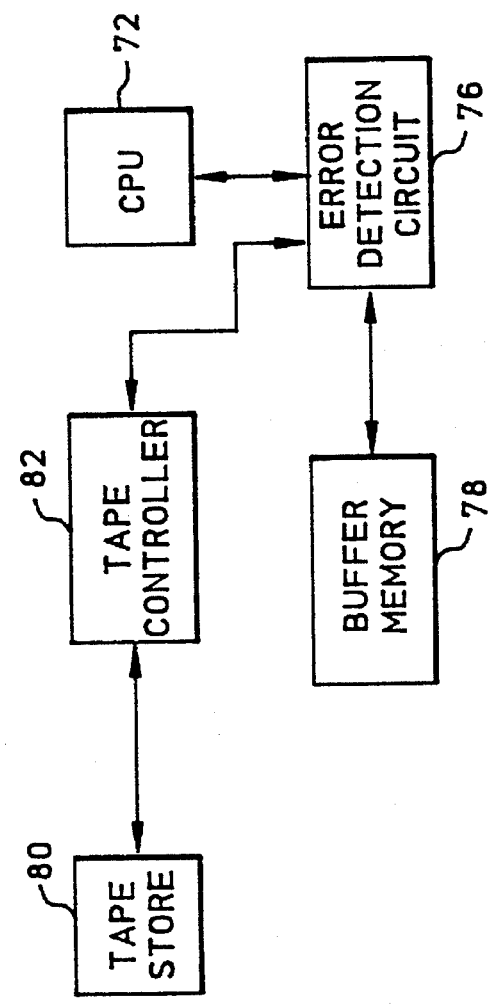
FIG. 7 illustrates the application of the error detection apparatus of this invention to a Magnetic Tape Storage System (MTSS)

FIG. 7 shows how either of the two methods of this invention can be applied to a MTSS that includes a buffer memory 78 made up of semiconductor memory or the like. The operation of the MTSS in FIG. 7 is similar to the DASD in FIG. 6. A tape store 80 serves to permanently store large quantities of data but is constrained to sequential data transfer during reading and writing operations. Store 80 is directly connected to a tape controller 82, which performs the necessary block transfer operations to store and retrieve data from tape store 80. The error detection circuit 76 of this invention may be disposed as illustrated in FIG. 7, connected to buffer memory 78 and to both CPU 72 and tape controller 82. Either the Location stamp apparatus of FIG. 2 or the Identification Stamp apparatus of FIG. 4 can be included in error detection circuit 76 of FIG. 7.

Clearly, other embodiments and modifications of this invention will occur readily to those of ordinary skill in the art in view of these teachings. Therefore, this invention is to be limited only by the following claims, which include all such embodiments and modifications when viewed with conjunction with the above specification and accompanying drawing.

I claim:

1. A method for detecting errors in a memory controller for writing data to and reading data from a storage device, said memory controller having at least one identifier register mad one or more address and data registers coupled to said storage device, each said register for storing a plurality of bits having a binary sum represented by a parity, said method comprising the steps of:

setting an address parity bit equal to the parity of an n-bit address word in a first said address register, where n is a positive integer;

setting a data parity bit equal to the parity of an m-bit data word in a first said data register, where m is a positive integer;

selecting at least one identifier bit from said identifier register responsive to one or more least-significant-bits in said first address register;

selecting one address bit from said first address register responsive to one or more least-significant-bits in said first address register;

setting a global parity bit equal to the parity of a concatenation of said data parity bit, said address parity bit, said one selected address bit and said at least one selected identifier bit;

storing said global parity bit in said storage device when writing data to said storage device;

repeating said setting and selecting steps upon reading data front said storage device to recreate said global parity bit; and comparing said stored global parity bit to said recreated global parity bit, thereby detecting an error condition when said stored and recreated global parity bits are different.

2. A method for detecting errors in a memory controller for writing data to and reading data from a storage device, said memory controller having one or more address and data registers coupled to said storage device, each said register for storing a plurality of bits having a binary sum represented by a parity, said method comprising the steps of:

setting an address parity bit equal to the parity of an n-bit address word in a first said address register, where n is a positive integer;

setting a data parity bit equal to the parity of an m-bit data word in a first said data register, where m is a positive integer;

selecting one address bit from said first address register responsive to one or more least-significant-bits in said first address register;

setting a global parity bit equal to the parity of a concatenation of said data parity bit, said address parity bit, and said one selected address bit;

storing said global parity bit in said storage device when writing data to said storage device;

repeating said setting and selecting steps upon reading data from said storage device to recreate said global parity bit; and comparing said stored global parity bit to said recreated global parity bit, thereby detecting an error condition when said stored and recreated global parity bits are different.

3. A method for detecting errors in a memory controller for writing, data to and reading data from a storage device, said memory controller having at least one identifier register and one or more address and data registers coupled to said storage device, each said register for storing a plurality of bits having a binary sum represented by a parity, said method comprising the steps of:

setting a data parity bit equal to the parity of an m-bit data word in a first said data register where m is a positive integer;

selecting at least one identifier bit from said identifier register responsive to one or more least-significant-bits in said first data register;

setting a global parity bit equal to parity of a combination of said parity bit and said at least one selected identifier bit;

storing said global parity bit in said storage device when writing data to said storage device; and comparing said stored global parity bit to a global parity bit recreated upon reading data from said storage device, thereby detecting a data or address error condition when said stored and recreated global parity bits are different.

4. A memory controller for reading data from and writing data into a storage device, said data including at least one parity bit, said memory controller comprising:

address register means coupled to said data storage device for holding at least one n-bit memory address, each said memory address having n storage bits where n is a positive integer;

address parity generating means coupled to said address register means for generating at least one address parity bit representative of all but an omitted one of said n storage bits from said address register means;

data register means coupled to said data storage device for holding at least one m-bit data word, where m is a positive integer;

data parity generating means coupled to said data register means for generating a data parity bit representative of m bits from said data register means;

identifier register means coupled to said address parity generating means for holding at least one p-bit identifier word, where p is a positive integer;

global parity generating means coupled to said address parity generating means, said data parity generating means and said identifier register means for generating a global parity bit representative of a combination of said address parity bit, said data parity bit and at least one identifier bit from said identifier register means; and global parity checking means coupled to said data storage device and said global parity generating means for comparing said global parity bit with a corresponding parity bit from said storage device and for indicating all error condition when said global and corresponding parity bits differ.

5. The memory controller of claim 4 further comprising:

address bit selecting means coupled to said address register means for selecting said omitted one of said n storage bits responsive to one or more least-significant-bits from said address register means; and identifier bit selecting means coupled to said identifier register means and said address register means for selecting said at least one identifier bit responsive to one or more least-significant-bits from said address register means.

6. A Direct Access Storage Device (DASD) comprising:

rotatable disk means for storing data;

control means coupled to said rotatable disk means for writing data onto and reading data from said rotatable disk means;

buffer memory means coupled to said control means for storing at least one data block; and error detecting means coupled to said buffer memory means for storing data into and retrieving data from said buffer memory means, said data including at least one parity bit, said error detecting means having address register means coupled to said buffer memory means for holding at least one memory address, each said memory address having n storage bits where n is a positive integer, address parity generating means coupled to said address register means for generating at least one address parity bit representative of all but an omitted one of said n storage bits from said address register means, data register means coupled to said buffer memory means for holding at least one data word, each said data word having m storage bits where m is a positive integer, data parity generating means coupled to said data register means for generating a data parity bit representative of m bits from said data register means, identifier register means coupled to said address parity generating means for holding at least one p-bit identifier word, where p is a positive integer, global parity generating means coupled to said address parity generating means, said data parity generating means and said identifier register means for generating a global parity bit representative of a combination of said address parity bit, said data parity bit and at least one identifier bit from said identifier register means, and global parity checking means coupled to said buffer memory means and said global parity generating means for comparing said global parity bit with a corresponding parity bit from said buffer memory means and for indicating an error condition when said global and corresponding parity bits differ.

7. In a Direct Access Storage Device (DASD) having rotatable disk means for storing data, control means for writing data onto and reading data from said rotatable disk means buffer memory means coupled to said control means for storing at least one data block and error detecting means for writing data to and reading data from said buffer memory means, said error detecting means having at least one identifier register and one or more address and data registers coupled to said buffer memory means, each said register for storing a plurality of bits having a binary sum represented by a parity, a method for detecting errors in said error detecting means, said method comprising the steps of:

setting an address parity bit equal to the parity of an n-bit address word in a first said address register, where n is a positive integer;

setting a data parity bit equal to the parity of an m-bit data word in a first said data register, where m is a positive integer;

selecting at least one identifier bit from said identifier register responsive to one or more least-significant-bits in said first address register;

selecting one address bit from said first address register responsive to one or more least-significant-bits in said first address register;

setting a global parity bit equal to the parity of a concatenation of said data parity bit, said address parity bit, said one selected address bit and said at least one selected identifier bit;

storing said global parity bit in said buffer memory means when writing data to said buffer memory means;

repeating said setting and selecting steps upon reading data from said storage device to recreate said global parity bit; and comparing said stored global parity bit to said recreated global parity bit, thereby detecting an error condition when said stored and recreated global parity bits are different.

8. In a Direct Access Storage Device (DASD) of the type having rotatable disk means for storing data, control means for writing data onto and reading data from said rotatable disk means buffer memory means coupled to said control means for storing at least one data block and error detecting means for writing data to and reading data from said buffer memory means, said error detecting means having one or more address and data registers coupled to said buffer memory means, each said register for storing a plurality of bits having a binary sum represented by a parity, a method for detecting errors in said error detecting means, said method comprising the steps of:

setting an address parity bit equal to the parity of an n-bit address word in a first said address register, where n is a positive integer;

setting a data parity bit equal to the parity of an m-bit data word in a first said data register, where m is a positive integer;

selecting one address bit from said first address register responsive to one or more least-significant-bits in said first address register;

setting a global parity bit equal to the parity of a concatenation of said data parity bit, said address parity bit and said one selected address bit;

storing said global parity bit in said buffer memory means when writing data to said buffer memory means;

repeating said setting and selecting steps upon reading data from said storage device to recreate said global parity bit; and comparing said stored global parity bit to said recreated global parity bit, thereby detecting an error condition when said stored and recreated global parity bits are different.

9. A Magnetic Tape Storage System (MTSS) comprising:

magnetic tape means for storing data;

control means coupled to said magnetic tape means for writing data onto and reading data from said magnetic tape means;

buffer memory means coupled to said control means for storing at least one data block; and error detecting means coupled to said buffer memory means for reading data from and writing data into said buffer memory means, said data including at least one parity bit, said error detecting means having address register means coupled to said buffer memory means for holding at least one memory address, each said memory address having n storage bits where n is a positive integer, address parity generating means coupled to said address register means for generating at least one address parity bit representative of all but an omitted one of said n storage bits from said address register means, data register means coupled to said buffer memory means for holding at least one data word, each said data word having m storage bits where m is a positive integer, data parity generating means coupled to said data register means for generating a data parity bit representative of said m storage bits from said data register means, identifier register means for holding at least one p-bit identifier word, where p is a positive integer, global parity generating means coupled to said address parity generating means, said data parity generating means and said identifier register means for generating a global parity bit representative of a combination of said address parity bit, said data parity bit and at least one identifier bit from said identifier register means, and global parity checking means coupled to said buffer memory means and said global parity generating means for comparing said global parity bit with a corresponding parity bit from said buff or memory means and for indicating an error condition when said global and corresponding parity bits differ.

10. In a magnetic Tape Storage System (MTSS) having magnetic tape storage means for storing data, control means for writing data onto and reading data from said magnetic tape means buffer memory means coupled to said control means for storing at least one data block and error detecting means for writing data to and reading data from said buffer memory means, said error detecting means having at least one identifier register and one or more address and data registers coupled to said buffer memory means, each said register for storing a plurality of bits having a binary sum represented by a parity, a method for detecting errors in said error detecting means, said method comprising the steps of:

setting an address parity bit equal to the parity of an n-bit address word in a first said address register, where n is a positive integer;

setting a data parity bit equal to the parity of an m-bit data word in a first said data register, where m is a positive integer;

selecting at least one identifier bit from said identifier register responsive to one or more least-significant-bits in said first address register;

selecting one address bit from said first address register responsive to said one or more least-significant-bits in said first address register;

setting a global parity bit equal to the parity of a concatenation of said data parity bit, said address parity bit, said one selected address bit and said at least one selected identifier bit;

storing said global parity bit in said buffer memory means when writing data to said buffer memory means;

repeating said setting and selecting steps upon reading data from said storage device to recreate said global parity bit; and comparing said stored global parity bit to said recreated global parity bit, thereby detecting an error condition when said stored and recreated global parity bits are different.

11. In a Magnetic Tape Storage System (MTSS) of the type having magnetic tape means for storing data, control means for writing data onto and reading data from said magnetic tape means buffer memory means coupled to said control means for storing at least one data block and error detecting means for writing data to and reading data from said buffer memory means, said error detecting means having one or more address and data registers coupled to said buffer memory means, each said register for storing a plurality of bits having a binary sum represented by a parity, a method for detecting errors in said error detecting means, said method comprising the steps of:

setting an address parity bit equal to the parity of an n-bit address word in a first said address register, where n is a positive integer;

setting a data parity bit equal to the parity of an m-bit data word in a first said data register, where m is a positive integer;

selecting one address bit from said first address register responsive to one or more least-significant-bits in said first address register;

setting a global parity bit equal to the parity of a concatenation of said data parity bit, said address parity bit and said one selected address bit;

storing said global parity bit in said buffer memory means when writing data to said buffer memory means;

repeating said, setting and selecting steps upon reading data from said storage device to recreate said global parity bit; and comparing said stored global parity bit to said recreated global parity bit, thereby detecting an error condition when said stored and recreated global parity bits are different.

* * * * *

UNITED STATES PATENT AND TRADEMARK OFFICE
CERTIFICATE OF CORRECTION

PATENT NO. : 5,537,425
DATED : July 16, 1996
INVENTOR(S) : Tsou

It is certified that error appears in the above-indentified patent and that said Letters Patent is hereby corrected as shown below:

```
Column  8, line 22, change "mad" to --and--.
Column  9, line 14, change "writing," to --writing--.
Column 10, line 2, change, "indicating all" to --indicating an--.
Column 11, line 32, change "disk means" to --disk means,--.
Column 12, line 36, change "buff or' to --buffer--.
           line 39, change "magnetic" to --Magnetic--.
           line 43, change "tape means" to --tape means,--.
Column 13, line 13, change "tape means" to --tape means,--.
Column 14, line 15, change "repeating said," to --repeating said--.
```

Signed and Sealed this

First Day of July, 1997

Attest:

Attesting Officer

BRUCE LEHMAN

Commissioner of Patents and Trademarks